(12) United States Patent
Tatebe

(10) Patent No.: US 9,647,586 B2
(45) Date of Patent: May 9, 2017

(54) SIGNAL AMPLIFIER, PHASE DETECTOR, AND MOTOR DRIVE CONTROLLER

(71) Applicant: Tetsuroh Tatebe, Osaka (JP)

(72) Inventor: Tetsuroh Tatebe, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/682,352

(22) Filed: Apr. 9, 2015

(65) Prior Publication Data

US 2015/0303846 A1   Oct. 22, 2015

(30) Foreign Application Priority Data

Apr. 21, 2014   (JP) ................... 2014-087507

(51) Int. Cl.
*H02P 6/16*   (2016.01)

(52) U.S. Cl.
CPC ...................... *H02P 6/16* (2013.01)

(58) Field of Classification Search
CPC ........................................................ H02P 6/16
See application file for complete search history.

(56) References Cited

U.S. PATENT DOCUMENTS

| 2011/0089874 A1* | 4/2011 | Shimizu | H02P 6/16 318/400.04 |
| 2013/0099708 A1* | 4/2013 | Shimizu | G01D 5/2451 318/400.39 |
| 2013/0106326 A1 | 5/2013 | Kamatani et al. | |
| 2013/0106327 A1* | 5/2013 | Kamatani | H02P 6/16 318/400.06 |
| 2014/0347040 A1 | 11/2014 | Kawase | |
| 2014/0354271 A1 | 12/2014 | Kawase | |
| 2014/0361715 A1 | 12/2014 | Murata | |
| 2014/0365167 A1 | 12/2014 | Shimizu | |
| 2015/0009517 A1 | 1/2015 | Shimizu | |

FOREIGN PATENT DOCUMENTS

JP   2013-099023   5/2013

OTHER PUBLICATIONS

JP2011-237169.*
JP2013099022.*
U.S. Appl. No. 14/509,343, filed Oct. 8, 2014.

* cited by examiner

*Primary Examiner* — Shawki S Ismail
*Assistant Examiner* — Muhammad S Islam
(74) *Attorney, Agent, or Firm* — Cooper & Dunham LLP

(57) ABSTRACT

A signal amplifier for a phase detector, based on plural sensor signals having amplitude levels in accordance with a rotational position of a rotor of a motor to detect the rotational position thereof includes a first phase detector; a phase counter; a signal amplification factor operation circuit; a signal amplification factor controller; and a signal amplification unit.

13 Claims, 13 Drawing Sheets

FIG. 13

| PHASE INFORMATION SIGNAL | Hi | Low |
|---|---|---|
| U2 | U1 ≥ Ref | U1 < Ref |
| V2 | V1 ≥ Ref | V1 < Ref |
| W2 | W1 ≥ Ref | W1 < Ref |

FIG. 14

| PHASE INFORMATION SIGNAL | Hi | Low |
|---|---|---|
| U3 | U1 ≥ V1 | U1 < V1 |
| V3 | V1 ≥ W1 | V1 < W1 |
| W3 | W1 ≥ U1 | W1 < U1 |

FIG. 15

| PERIOD | INPUT CONDITION OF EACH SIGNAL | SELECTED SIGNAL | SIGNAL PHASE (°) |
|---|---|---|---|
| T1 | U3 = V3 = W3 = Low | W1 | 150 − 210 |
| T2 | U3 = W3 = Low, V3 = Hi | V1 | −30 − 30 |
| T3 | U3 = V3 = Hi, W3 = Low | U1 | 150 − 210 |
| T4 | U3 = V3 = W3 = Hi | W1 | −30 − 30 |
| T5 | U3 = W3 = Hi, V3 = Low | V1 | 150 − 210 |
| T6 | U3 = V3 = Low, W3 = Hi | U1 | −30 − 30 |

FIG. 16

| ELECTRIC ANGLE (°) | AMPLITUDE RATIO |
|---|---|
| −30.0 | −0.500 |
| −22.5 | −0.383 |
| −15.0 | −0.259 |
| −7.5 | −0.131 |
| 0 | 0 |
| 7.5 | 0.131 |
| 15.0 | 0.259 |
| 22.5 | 0.383 |
| 30.0 | 0.500 |

FIG. 17

| U2 | H | H | H | L | L | L |
|---|---|---|---|---|---|---|
| V2 | L | L | H | H | H | L |
| W2 | H | L | L | L | H | H |
| PHASE COUNTER NUMBER | 1 | 2 | 3 | 4 | 5 | 6 |

SIGNAL AMPLIFIER, PHASE DETECTOR, AND MOTOR DRIVE CONTROLLER

CROSS-REFERENCE TO RELATED APPLICATIONS

This patent application is based on and claims priority pursuant to 35 U.S.C. §119 to Japanese Patent Application No. 2014-087507 filed on Apr. 21, 2014 in the Japan Patent Office, the entire disclosure of which is hereby incorporated by reference herein.

BACKGROUND

Technical Field

The present invention relates to a signal amplifier amplifying plural sensor signals having amplitude levels in accordance with a rotational position of a rotor of a motor to have specified amplitude levels, and a phase detector and a motor drive controller equipped with the signal amplifier.

Description of the Related Art

It is necessary to detect a rotational angle of a rotor to control a rotational position of a motor. The rotational angle of a rotor is typically detected by a rotary encoder connected with a rotational axis of the rotor. In this case, the rotary encoder produces a 2-phase pulse signal varying in accordance with the rotational angle of the rotor and having a phase difference of 1/4 cycle. A relative rotational angle is detected from the edge detection and a High/Low status of the 2-phase.

An optical encoder as the rotary encoder is formed of a disc having slits as optical windows located at an equal interval on the outer circumference and two photo-interrupters located at a 1/4 interval of a split pitch of the disc. Signals produced from the two photo-interrupters are binarized to obtain the 2-phase pulse signal.

Japanese published unexamined application No. JP-2013-99023-A discloses a drive motor controller, in which plural sensor signals having signal levels in accordance with the rotational angle of the rotor are used to detect a phase information signal. Namely, since each of the sensor signals does not have a uniform common level and amplitude level, an amplitude level of each of the sensor signals is detected. The detected amplitude level is amplified to have a specified amplitude level such that each of the sensor signals have an ideal sine wave. A phase information signal is detected, based on the sensor signal, the amplitude of which is adjusted.

However, in the motor drive controller, the sensor signal varies in amplitude at every pole even in a one cycle of the motor due to uneven magnetization of a magnet used in the rotor. Therefore, when the amplitude of each of the sensor signals is uniformly adjusted, each of the sensor signals does not have an ideal sine wave, and the phase information signal cannot precisely be detected, based on each of the sensor signals.

SUMMARY

Accordingly, one object of the present invention is to provide a signal amplifier adjusting an amplitude of a sensor signal to detect a more precise phase information signal.

Another object of the present invention is to provide a position detector using the signal amplifier.

A further object of the present invention is to provide a motor drive controller using the signal amplifier.

These objects and other objects of the present invention, either individually or collectively, have been satisfied by the discovery of a signal amplifier for a phase detector generating a phase information signal, based on plural sensor signals having amplitude levels in accordance with a rotational position of a rotor of a motor having a plural-phase coil to detect the rotational position thereof, including a first phase detector to compare the plural sensor signals with specified plural threshold levels to detect a phase and produce a first phase information signal representing the phase; a phase counter to count the number of the phase to determine a signal amplification section of each of the sensor signals, based on the first phase information signal; an amplitude detector to detect or estimate a peak level of the sensor signal to produce a result signal; a signal amplification factor operation circuit to operate a signal amplification factor of each of the sensor signals such that the peak level or the estimated peak level of the senor signal represented by the result signal from the amplitude detector has a specified amplitude level; a signal amplification factor controller to determine the signal amplification section of each of the sensor signals, based on the number of the phase, and store and produce the signal amplification factor in accordance with the signal amplification section; and a signal amplification unit to amplify an amplitude level of each of the sensor signals, based on the signal amplification factor.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 13 is a diagram showing a comparison result signal relative to an input signal to the first phase detection circuit 10 in FIG. 1;

FIG. 14 is a diagram showing a comparison result signal relative to an input signal to a second phase detection circuit 120 in FIG. 1;

FIG. 15 is a chart showing a first signal selection condition of a signal selection circuit 21 in FIG. 1;

FIG. 16 is a chart showing a relationship between an electric angle and an amplitude ratio of a selection signal X from the signal selection circuit 21 in FIG. 1; and FIG. 17 is a chart showing operation of the phase counter 60 in FIG. 1.

DETAILED DESCRIPTION

Figure 1:
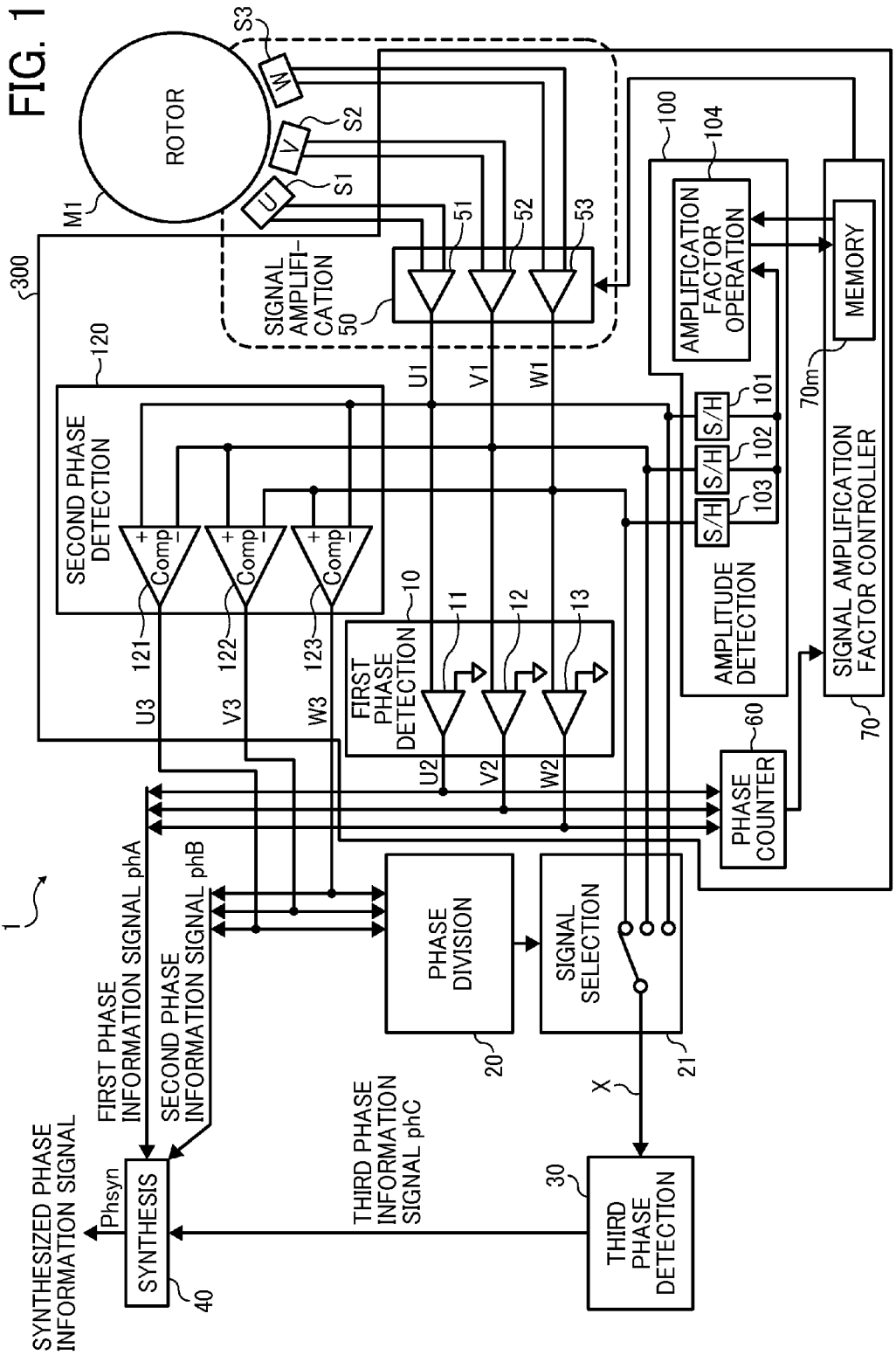
FIG. 1 is a block diagram showing a configuration of an embodiment 1 (a phase detector 1) of the present invention.

The present invention provides a signal amplifier adjusting an amplitude of a sensor signal to detect a more precise phase information signal.

Exemplary embodiments of the present invention are described in detail below with reference to accompanying drawings. In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Embodiment 1

FIG. 1 is a block diagram showing a configuration of an embodiment 1 (a phase detector 1) of the present invention. In FIG. 1, the phase detector 1 includes a magnetic sensors (sensors) S1 to S3 to detect a rotational angle of a rotor of a motor M1 therearound. The phase detector 1 detects and produces phase information of the motor M1, based on sensor signals U1, V1 and W1 which are differential sensor signals (U1, U1−; V1, V1−; W1, W1−) from the sensors S1 to S3 (U-phase, V-phase, W-phase) amplified by a signal amplification circuit 50. The signal amplification circuit 50 includes three amplifiers 51, 52 and 53. The phase detector 1 includes a signal amplifier 300, a phase dividing circuit 20, a signal selection circuit 21, a third phase detection circuit 30 and a synthetic circuit 40.

The signal amplifier 300 includes a first phase detection circuit 10 which is a first phase detector comparing each of the sensor signals U1, V1 and W1 with each of specified threshold levels to detect a phase and producing a first phase information signal representing the phase. The signal amplifier 300 further includes a phase counter 60 counting the number of phases to determine a signal amplification section of each of the sensor signals U1, V1 and W1, and an amplitude detection circuit 100 operating a signal amplification factor of the sensor signals U1, V1 and W1. In addition, the signal amplifier 300 includes a signal amplification factor controller 70 which is a signal amplification factor control unit determining a signal amplification section of each of the sensor signals U1, V1 and W1, based on the number of phases, and storing and producing a signal amplification factor operated in accordance with the signal amplification section. Further, the signal amplifier 300 includes a signal amplification circuit 50 which is a signal amplification unit amplifying an amplitude level of each of the sensor signals U1, V1 and W1, based on the signal amplification factor. Further, the signal amplifier 300 includes a second phase detector comparing each of the sensor signals U1, V1, W1 or relevant signals each other to detect a phase and producing a second phase information signal representing the phase.

The amplitude detection circuit 100 includes sample hold (S/H) circuits 101, 102 and 103 which are amplitude detection units detecting or estimating a peak level of each of the sensor signals U1, V1 and W1 and producing the result signal. In addition, the amplitude detection circuit 100 includes a signal amplification factor operation circuit operating a signal amplification factor of each of the sensor signals U1, V1 and W1 such that the peak level or the estimated peak level thereof represented by the result signal.

In FIG. 1, after each of the differential sensor signals from the sensors S1 to S3 is amplified and converted into signal end signal by the signal amplification circuit 50, it is entered in the first phase detection circuit 10, a second phase detection circuit 120 and the signal selection circuit 21. FIG. 13 is a diagram showing a comparison result signal relative to an input signal to the first phase detection circuit 10 in FIG. 1. The first phase detection circuit 10 includes three comparators 11, 12 and 13. As shown in FIG. 13, each of the comparators 11, 12 and 13 compares an entered amplitude of each of the differential sensor signals with a specified reference level Ref, and produces comparison result signals U2 to W2 having high or low levels to the synthetic circuit 40 and the phase counter 60. The comparison result signals U2, V2 and W2 from the first phase detection circuit 10 become a first phase information signal phA having a specified phase.

The second phase detection circuit 120 includes three comparltors 121, 122 and 123, and which produce digital comparison result signals U3, V3 and W3 according to FIG. 14 to the phase dividing circuit 20 and the synthetic circuit 40. The comparison result signals U3, V3 and W3 from the second phase detection circuit 120 become a second phase information signal phB having a specified phase.

The phase dividing circuit 20 produces a signal selection signal divided into a section having a specified phase section, based on the comparison result signals U3, V3 and W3 to the signal selection circuit 21. The sensor signals U1, V1 and W1 are entered in the signal selection circuit 21 as well, and which selects suitable signals as explained in detail hereafter, based on the signal selection signals from the phase dividing circuit 20, and produces a selected signal X to the third phase detection circuit 30.

Further, the third phase detection circuit 30 compares the selected signal X with plural threshold levels to produce a third phase information signal phC capable of knowing the motor M1 has rotated for a specified angle to the synthetic circuit 40. The plural threshold levels are predetermined levels in accordance with signal amplitudes of the rotational angle sensors S1 to S3.

The amplitude detection circuit 100 includes the sample hold (S/H) circuits 101, 102 and 103 for the sensors S1 to S3 respectively, and a signal amplification factor operation circuit 104. The sample hold (S/H) circuits 101, 102 and 103 for the sensors S1 to S3 respectively detect amplitude peak values of the respective sensor signals. In addition, the sample hold (S/H) circuits 101, 102 and 103 sample-hold amplitudes at specified electric angles such as sensor intersection points and estimates peak levels using peak level convertors converting the peak values. The signal amplification factor operation circuit 104 operates such that the detected peak level or the estimated peak level of the signal amplitude is a specified amplitude level, and produces an operated signal amplification factor to a memory 70*m* of a signal amplification factor controller 70.

The phase counter 60 receives the comparison result signals U2, V2 and W2 from the first phase detection circuit 10 to detect a rising edge or a falling edge thereof The phase counter 60 counts the number of phase counters which is information representing a phase showing a position of the rotor of the motor M1, based on the detected edge. Namely, the phase counters are counted using a combination of the first phase information signal phA. In the embodiment, as FIG. 17 shows, the phase counter 60 is set to increase the number of the phase counters one by one from the number 1 to 6 of the phase counters. When the phase counter 60 may count up or down when the motor M1 rotates in forward direction.

The signal amplification factor controller 70 determines a signal amplification section amplifying each of the differential sensor signals from each of the sensors S1 to S3, based on the number of poles information in the motor M1 and the number of phase counters from the phase counter 60 previously stored in the memory 70*m*. The signal amplification factor controller 70 stores a signal amplification factor in the signal amplification section, operated by the signal amplification factor operation circuit 104 in the memory 70*m* and outputs the signal amplification factor to the signal amplification circuit 50. Next, the signal amplification factor controller 70 produces a signal amplification factor in accordance with the signal amplification section amplifying the differential sensor signal from each of the sensors S1, S2 and S3 (U-phase, V-phase and W-phase) to the signal amplification circuit 50. The signal amplification section depends on an operational status of the phase counter 60 before and after the edge of the first phase information signal phA of each phase. When the phase counter 60 counts up, signal amplification section counts up as well. When the phase counter 60 counts down, signal amplification section counts down as well. Further, the signal amplification section of each phase in one cycle changes in accordance with the number of poles of the motor M1, i.e., 12 sections for the motor M1 having 12 poles and 8 sections for the motor M1 having 8 poles.

The signal amplification circuit 50 amplifies the differential sensor signal from each of the sensors S1, S2 and S3, based on the signal amplification factor produced from the signal amplification factor controller 70. The signal amplification circuit 50 outputs the amplified differential sensor signals to the first phase detection circuit 10, the second phase detection circuit 120 and the signal selection circuit 21 as sensor signals U1, V1 and W1. Namely, the signal amplification circuit 50 receives a signal amplification factor from the signal amplification factor controller 70 and adjusts the amplitude level of each of the sensor signals, based on the signal amplification factor. Therefore, since each of the sensors S1, S2 and S3 produces a specified amplitude level, phase information closer to the actual rotational angle of a rotor can be obtained.

The synthetic circuit 40 synthesizes the first phase information signal phA, second phase information signal phB and the third phase information signal phC, and produces at least one digital signal as a motor control signal.

Figure 2:
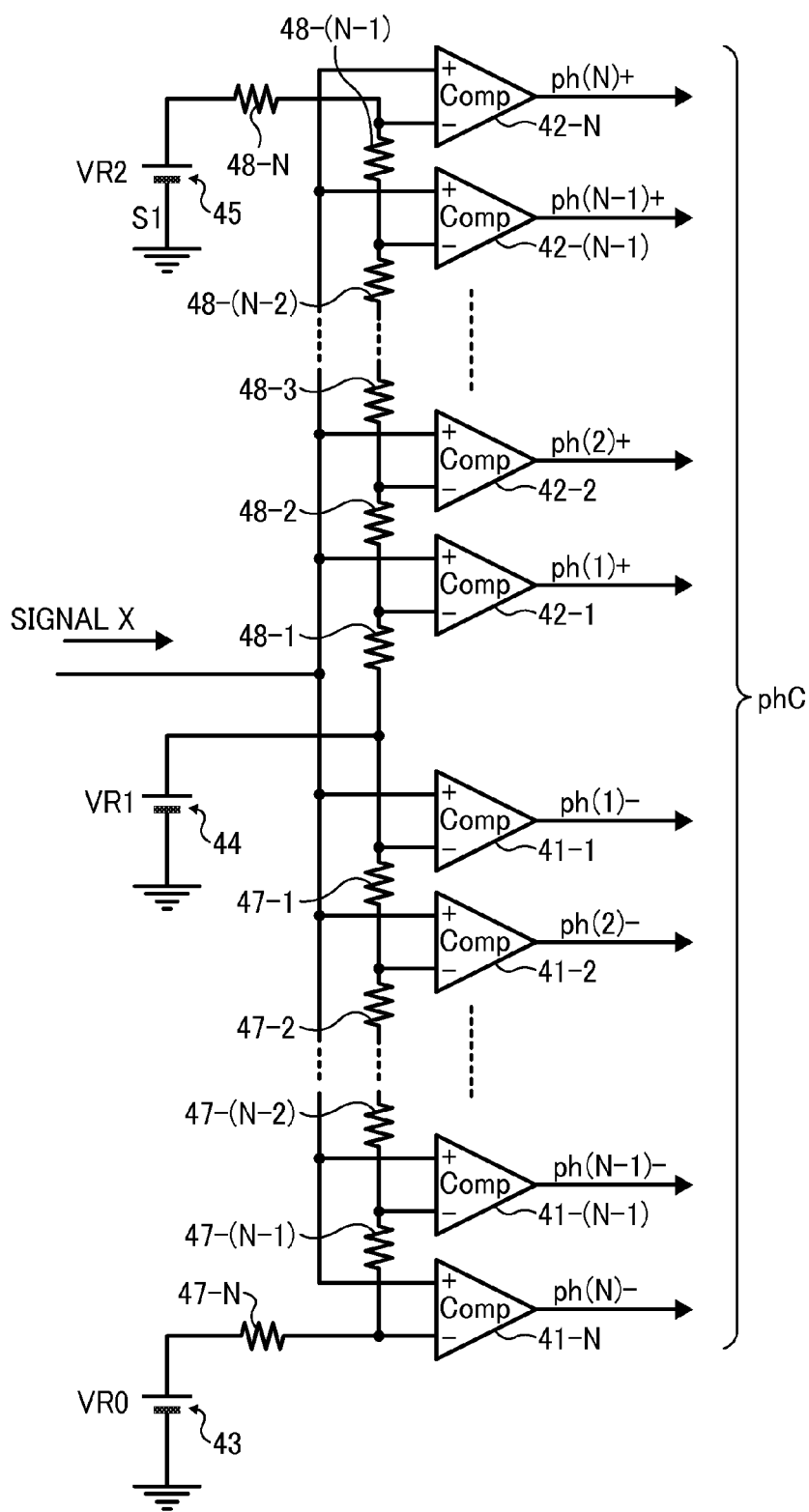
FIG. 2 is a circuit diagram showing a configuration of a third phase detection circuit 30 in FIG. 1.

FIG. 2 is a circuit diagram showing a configuration of a third phase detection circuit 30 in FIG. 1. In FIG. 2, the third phase detection circuit 30 includes three voltage sources 43, 44 and 45, plural 2N pieces of resistances 47-N to 47-1 and 48-1 to 48-N connected with each other in series, and plural 2N pieces of comparators 41-N to 41-1 and 42-1 to 42-N. The third phase detection circuit 30 compares a signal amplitude of the selected signal X with plural threshold levels to generate the phase information signal phC (ph(N)– to ph(1)– and ph(1)+ to ph (N)+). In FIG. 2, the voltage source 44 has a voltage VR1 level which is an amplitude center (common) level of a sine wave. The voltage sources 45 and 43 has voltage VR2 and VR0 levels in accordance with sine wave maximum and minimum levels respectively. A level divided at an amplitude ratio interval in accordance with an electric angle with the voltage VR1 level as the center is compared with the selected signal X. The selected signal X monotonically increases or decreases to switch the phase information signal phC in turns.

Figure 3:
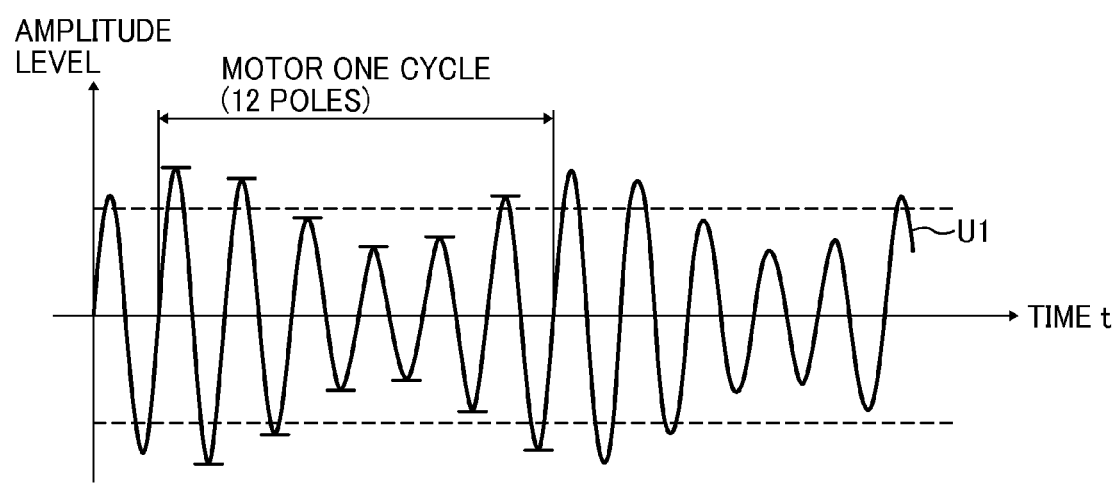
FIG. 3 is a temporal axis waveform diagram showing variation of an amplitude level of a sensor signal U1 relative to a time t in FIG. 1.

FIG. 3 is a temporal axis waveform diagram showing variation of an amplitude level of a sensor signal U1 relative to a time t in FIG. 1. In FIG. 3, the differential sensor signals from the sensors S1, S2 and S3 (U-phase, V-phase and W-phase) do not have uniform common levels or amplitude levels. The amplitude levels are electrically very small. When they are uniform and large, the third phase information signal phC shows a value close to the actual rotational angle of a rotor. Namely, when the differential sensor signals from the sensors S1, S2 and S3 are not uniform, based on the signal amplification factor from the amplification factor controller 70, the signal amplification circuit 50 adjusts the common levels or the amplitude levels such that each of the sensor signals U1, V1 and W1 has an ideal sine wave. In addition, each of the sensor signals U1, V1 and W1, besides the common levels or the amplitude levels, has uneven amplitude even in one phase due to uneven magnetization used for a rotor (hereinafter referred to as an uneven amplitude in one cycle). Therefore, even when the common levels and the amplitude levels are uniformly amplified in a phase, the uneven amplitude in one cycle cannot be removed, and it is impossible to detect a phase with high preciseness. The amplitude needs adjusting for every pole in accordance with the uneven magnetization. Further, each of the sensor signals U1 and V1 in FIG. 1 has an uneven amplitude in one cycle as the sensor signal U1 in FIG. 3 does, and the amplitude needs adjusting for every pole in accordance with the uneven magnetization.

Operation of the phase detector 1 of the embodiment 1 is explained.

Figure 4:
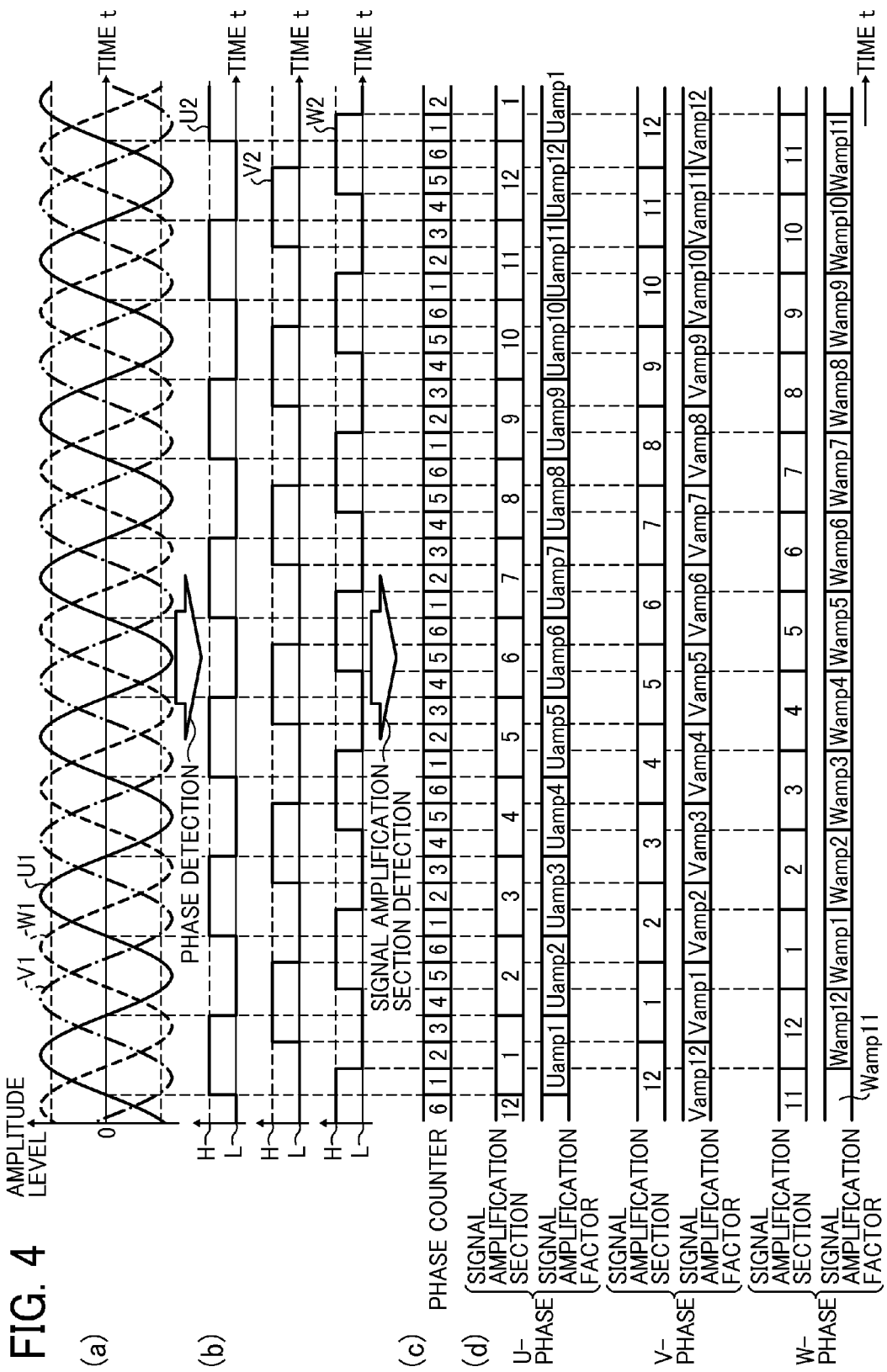
FIG. 4 (a) is a temporal axis waveform diagram showing variation of an amplitude level of each of sensor signals U1, V1 and W1 relative to a time t, which is generated by each of sensors S1, S2 and S3 of the phase detector 1 in FIG. 1; (b) has a common time axis with (a), and is a temporal axis waveform diagram showing variation of an amplitude level of each of comparison result sensor signals U2, V2 and W2 relative to a time t, which is generated by a first phase detection circuit 10; (c) has a common time axis with (a), and is a timing chart showing variation of the number of the phase counted by a phase counter 60; and (d) has a common time axis with (a), and is a timing chart showing variation of a signal amplification factor stored in a signal amplification section of each of the phases, determined on the basis of the number of the phase (c)

FIG. 4 (*a*) is a temporal axis waveform diagram showing variation of an amplitude level of each of the sensor signals U1, V1 and W1 relative to a time t, which is generated by each of sensors S1, S2 and S3 of the phase detector 1 in FIG. 1. FIG. 4 (*b*) has a common time axis with FIG. 4 (*a*), and is a temporal axis waveform diagram showing variation of an amplitude level of each of the comparison result sensor signals U2, V2 and W2 relative to a time t, which is generated by a first phase detection circuit 10. FIG. 4 (*c*) has a common time axis with FIG. 4 (*a*), and is a timing chart showing variation of the number of the phase counted by a phase counter 60. FIG. 4 (*d*) has a common time axis with FIG. 4 (*a*), and is a timing chart showing variation of a signal amplification factor stored in a signal amplification section of each of the phases, determined on the basis of the number of the phase in FIG. 4 (*c*). In FIGS. 4 (*a*) and 4 (*b*), based on each of the sensor signals U1, V1 and W1, a signal level of each of the comparison result signals U2, V2 and W2 is determined. The first phase detection circuit 10 detects a timing when the amplitude level of the sine wave signal of each of the sensor signals U1, V1 and W1 becomes a reference level, and outputs the timing to the phase counter 60. Namely, the first phase detection circuit 10 produces a high or a low signal level to the phase counter 60 at a timing when the amplitude level of each of the sensor signals U1, V1 and W1 passes the reference level. Next, the phase counter 60 increases the number of phase counters one by one at a timing of change of the signal level from the first phase detection circuit 10. The phase counter 60 counts up when the motor M1 rotates in a forward direction, and the signal amplification section is determined, based on the number of phase counters counted by the phase counter 60. Namely, the signal amplification section depends on an operational status of the phase counter 60 before and after the rising or the falling edge of the first phase information signal phA of each phase. For example, when the phase counter counts up, the signal amplification section counts up as well. When the phase counter counts down, the signal amplification section counts down as well. In the embodiment, as FIG. 4 (*c*) shows, the phase counter 60 counts up from the phase counter numbers 1 to 6. Further, the signal amplification section changes in accordance with the number of poles of the motor M1, i.e., 12 sections for the motor M1 having 12 poles and 8 sections for the motor M1 having 8 poles. Next, as FIG. 4 (*d*) shows, the signal amplification factor operated by the signal amplification factor operation circuit 104 for each of the determined signal amplification section is stored. For example, as for U-phase sensor signals, the phase counter numbers 1 to 3 correspond to the signal amplification section 1, and a signal amplification factor Uamp 1 is stored in the signal amplification section. The phase counter numbers 4 to 6 correspond to the signal amplification section 2, and a signal amplification factor Uamp 2 is stored in the signal amplification section. The same applies hereafter.

Figure 5:
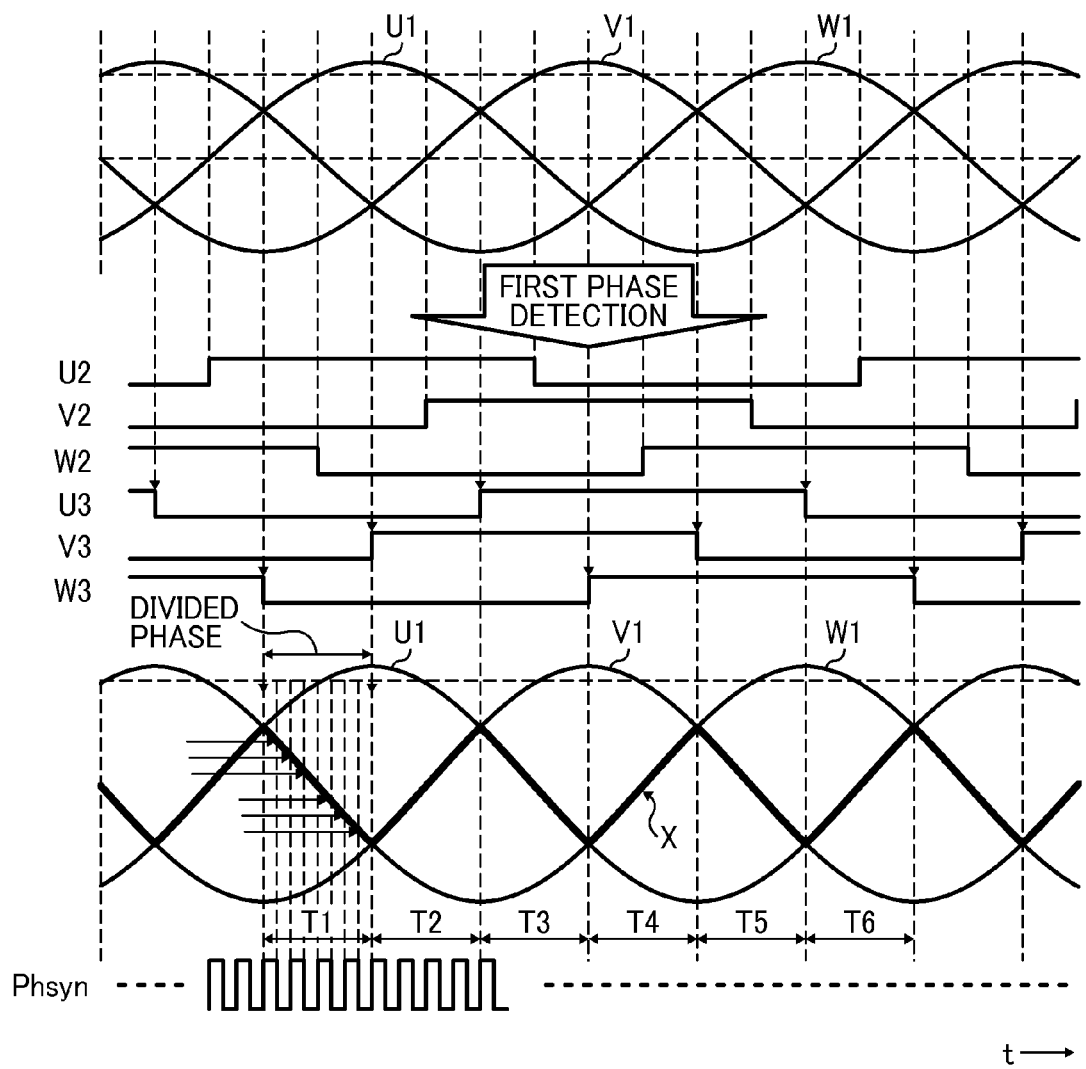
FIG. 5 is a timing chart of each of signals showing operation status of the phase detector 1 in FIG. 1.

FIG. 5 is a timing chart of each of signals showing operation status of the phase detector 1 in FIG. 1. In FIG. 5, non-inverted signals U1, V1 and W1 of the differential sensor signals from the sensors S1, S2 and S3 are represented by sine waves (may be waveforms substantially the same as or conform to the sine waves instead thereof). The sensors S1, S2 and S3 are located at an interval of an electric angle of 120°. Inverted signals U1−, V1− and W1− of the differential sensor signals are configured so as to from reverse phases of their sine waves.

The first phase detection circuit 10 compares the differential sensor signals (U1, U1−; V1, V1−; W1, W1−) with their amplitude center (common) levels to obtain the comparison result signals U2, V2 and W2. The second phase detection circuit 120 compares the sensor signals U1, V1 and W1 with their amplitude center (common) levels to obtain the comparison result signals U3, V3 and W3 as FIG. 15 shows.

Further, the phase dividing circuit 20 performs a phase division of the comparison result signals U3, V3 and W3 at their switch edges and edge sections. In the specified phase dividing section, e.g., in FIG. 5, a selected signal X is obtained by being selectively switched according to FIG. 15. Each of the selected signals X are shown in bold lines at the bottom in FIG. 5. The selected signal X is divided into a 60° section having high linearity such as a sine wave phase −30 to 30° or 150 to 210°. Namely, the divided phase section is equivalent to an electric angle of 60°. Further, the selected signal X is a horizontal line in FIG. 2. This is the specified threshold level, and when the selected signal X reaches the specified threshold level, a pulse edge is produced. For example, when an interval between electric angles −30° and 30° is divided into 8 sections at every 7.5°, the amplitude and the electric angle have a relation in FIG. 16. However, the selected sensor signal has a common level of 0, and the electric angle of 90° has an amplitude of 1. According to FIG. 16, a specified threshold level at each ratio relative to a sine eave amplitude of the selected signal X is determined Since the electric angle of −30° and 30° can use the second phase information signal phB and the electric angle of 0° can use the first phase information signal phA, a specified threshold level of the third phase detection circuit 30 is not always needed.

As having been explained, a signal produced every time when the selected signal X reaches an amplitude level in accordance with the electric angle is used, phase data not less than the number of phase information signals obtained with the first phase information signal phA can be obtained. In FIG. 5, the selected signal X is a section relevant to a width from an electric angle −30° to electric angle 30° or 150° to 210° of a sine wave of each of the sensor signals. Even when the phase section switched to change the selected sensor signal, the selected signal X is a continuous signal. The third phase information signal phC which is a comparison result signal from the third phase detection circuit in FIG. 1 can form the final synthetic signal as a gray code because an adjacent signal switches in turns. The specified threshold levels are predetermined levels in accordance with signal amplitudes of the rotational angle sensors S1, S2 and S3. An embodiment of a synthetic circuit synthesizing the third phase information signal phC from the third phase detection circuit and the phase information signals phA and phB from the first and the second phase detection circuits respectively to produce a two-phase digital signal is explained.

Figure 6:
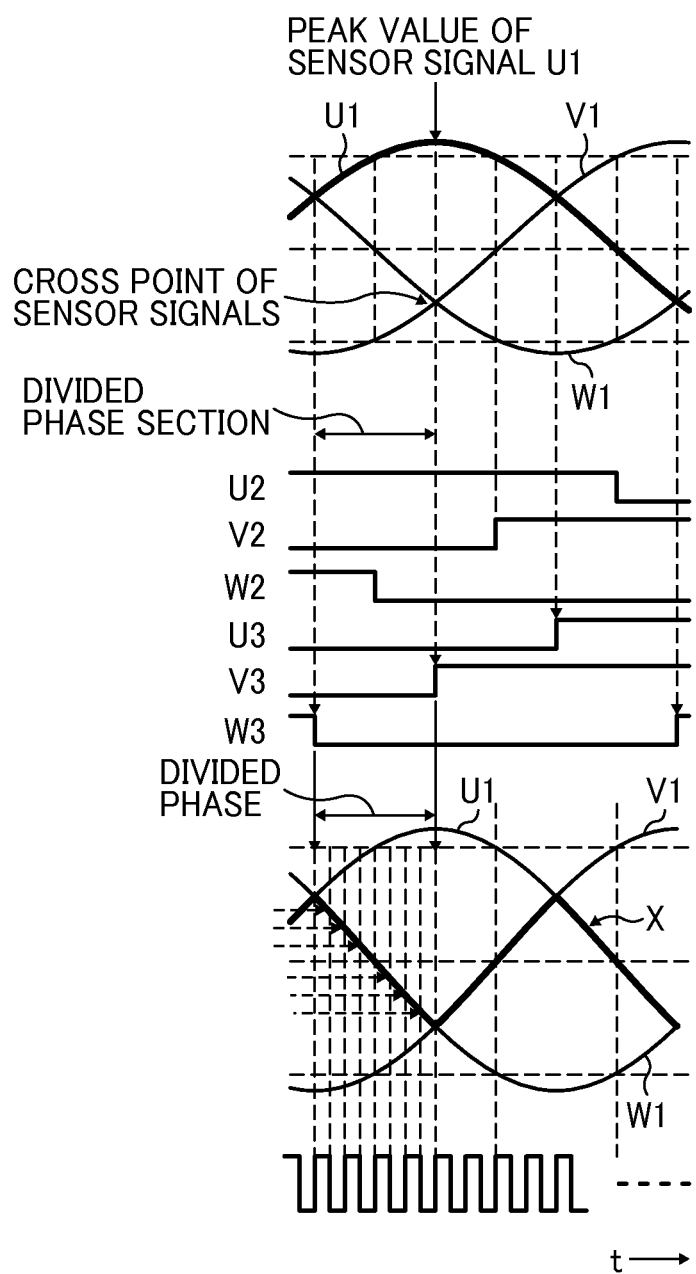
FIG. 6 is a timing chart of each of signals showing operation in a divided phase section in the phase detector 1 in FIG. 1.

FIG. 6 is a timing chart of each of signals showing operation in a divided phase section in the phase detector 1 in FIG. 1. An embodiment of amplitude level detection timing is explained, referring to a part of FIG. 6. In a divided phase section in FIG. 6, a sensor signal W1 is detected in the third phase detection circuit 30 as a selected signal X. Since the sensor signals U1, V1 and W1 have a phase difference of 120° respectively, the sensor signal U1 ideally reaches a sine wave amplitude peak at an intersection point of the sensor signals V1 and W1. Therefore, sampling a signal level of the sensor signal U1 at the cross point detects an amplitude of the sensor signal U1. The same applies to the sensor signals V1 and W1 hereafter. The selected signal X switches from the sensor signal W1 to the sensor signal U1 at a divided phase switching point. Therefore, even when a signal amplitude of the sensor signal U1 is detected and operate to quickly adjust a signal amplification factor of the amplifier 51 related to the sensor signal U1, there is no possibility of errors and malfunctions in the first, the second and the third phase detection circuits 10, 20 and 30. Accordingly, while the third phase detection is executed in each divided phase section, an amplitude detection and a signal amplification adjustment of phase-undetected signals are executed at the same time to constantly correct signals in real time.

Figure 7:
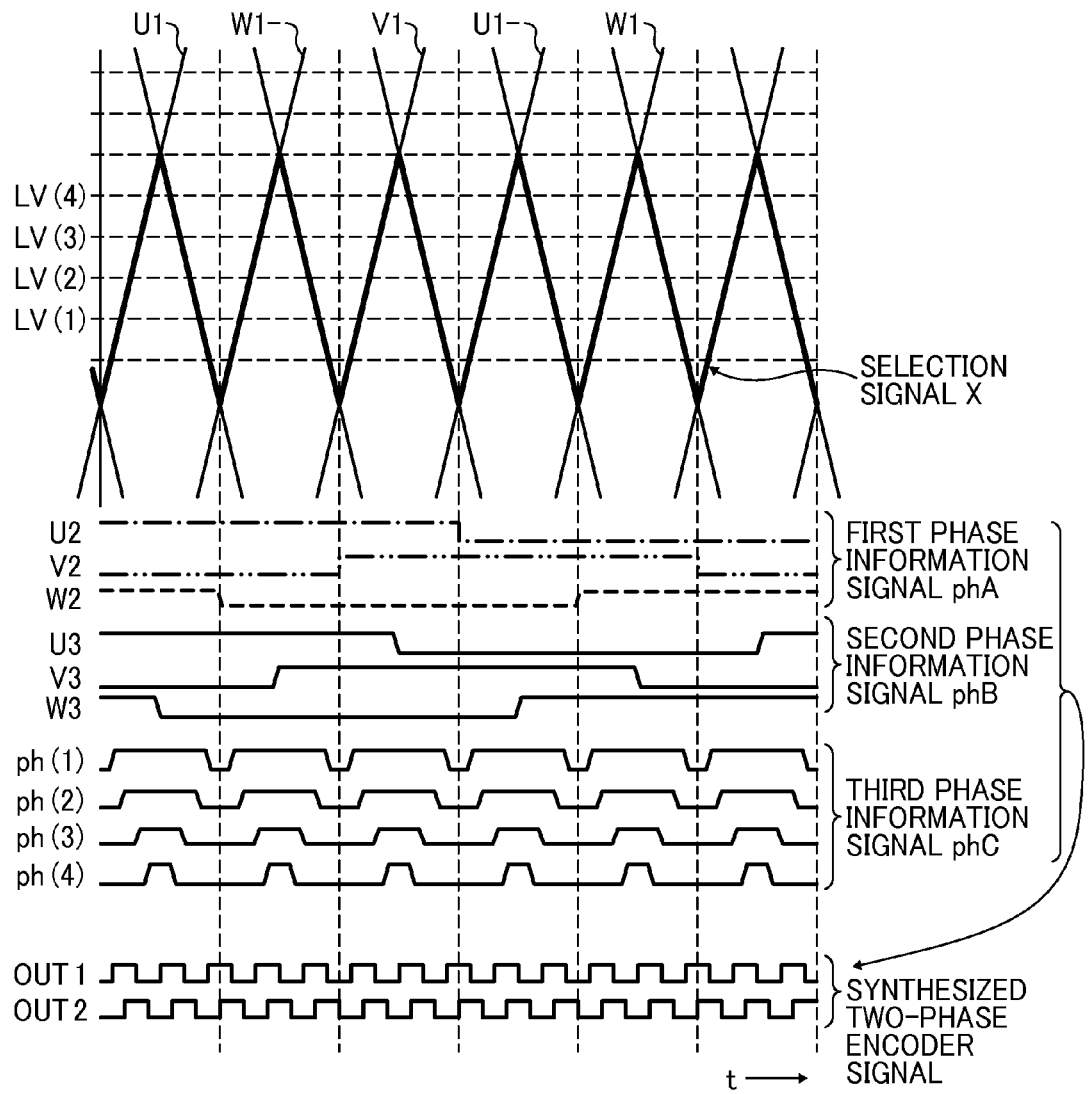
FIG. 7 is a timing chart of each of signals showing operation of the third phase detection circuit 30 in FIG. 1.

FIG. 7 is a timing chart of each of signals showing operation of the third phase detection circuit 30 in FIG. 1. FIG. 7 shows the selected signal X in FIG. 5, and phase information signals ph (1) to ph (4) which are the third phase information signals phC from the third phase detection circuit 30 having specified threshold levels of from LV (1) to LV (4) such that an electric angle of 30° is divided into five equal parts. The synthetic circuit 40 synthesizes the phase information signals ph (1) and ph (3), and the comparison result signals U3, V3 and W3 to produce a digital signal OUT 1. In addition, the synthetic circuit 40 synthesizes the phase information signals ph (2) and ph (4), and the comparison result signals U2, V2 and W2 to produce a digital signal OUT 2. This enables easily obtaining an encoder signal having 1/4 phase difference without an optical encoder.

The signal amplifier 300 of the embodiment detects a signal amplification section in accordance with a pole of the motor M1 and adjust an amplitude level of each of the sensor signals U1, V1 and W1 for every detected signal amplification section. Therefore, uneven amplitude of each of the sensor signals due to uneven magnetization used for a rotor is prevented to form an ideal sine wave. A precise rotational position information signal is generated to accurately detect a rotational position information of the motor M1.

In the embodiment, the amplification factor controller 70 outputs a signal amplification factor operated by the signal amplification factor operation circuit 104 to the signal amplification circuit 50 in real time, but the present invention is not limited thereto. A signal amplification factor in accordance with the same signal amplification section one cycle later may be produced. Namely, the motor M1 rotates once, and a signal amplification factor is operated in a signal amplification section of each phase and stored. The stored signal amplification factor may be used in the same signal amplification section of a following rotation of the motor M1 to adjust a signal level of each phase.

Figure 8:
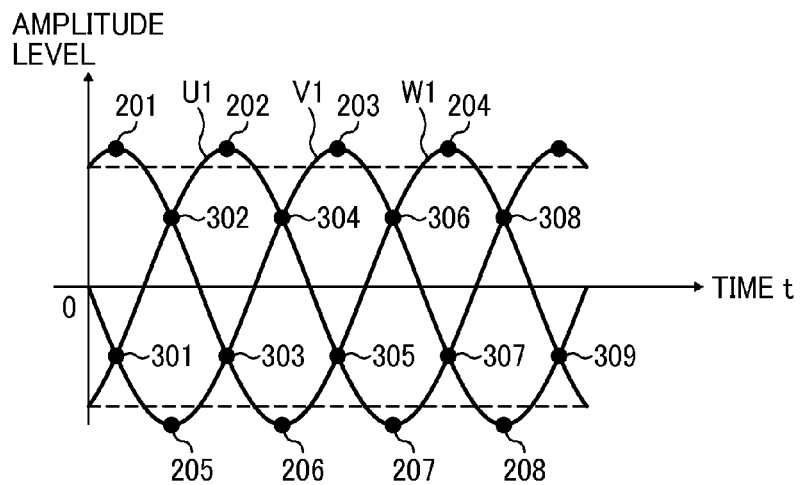
FIG. 8 is a temporal axis waveform diagram showing variation of an amplitude level of each of sensor signals U1, V1 and W1 relative to a time t, which is generated by each of sensors S1, S2 and S3 of the phase detector 1 in FIG. 1.

In addition, the amplitude detection circuit 100 detects peak values 201 to 208 (Ref.: FIG. 8) of amplitude level of each of the sensor signals U1, V1 and W1 by using the sample hold circuits 101, 102 and 103, but the present invention is not limited thereto. Amplitude levels of intersection points 301 to 309 (Ref: FIG. 8) of each of the sensor signals U1, V1 and W1 may be detected to adjust the amplitude such that each of the sensor signals U1, V1 and W1 has an ideal sine wave. In this case, each of the sample hold circuits 101, 102 and 103 of the amplitude detection circuit 100 receives the comparison result signals U3, V3 and W3 from the second phase detection circuit 120 instead of the sensor signals U1, V1 and W1 from the signal amplification circuit 50.

In the embodiment, the number of the phase counters are counted, using the first phase information signal phA, but the present invention is not limited thereto. The number of the phase counters may be counted, using the second phase information signal phB or both of the first phase information signal phA and the second phase information signal phB. When the number of the phase counters are counted, using the using the second phase information signal phB, the number of the phase counters and the number of the signal amplification sections are determined as they are when using the first phase information signal phA. Namely, the operation status of the phase counter depends on a combination of the comparison result signals U3, V3 and W3. The signal amplification section depends on an operational status of the phase counter before and after the rising or the falling edge of the second phase information signal phB of each phase. When the phase counter counts up (down), the signal amplification section counts up (down) as well. When the number of the phase counters are counted, using the first phase information signal phA and the second phase information signal phB, an operational status of the phase counter depends on a combination of the comparison result signals U2, V2, W2, U3, V3 and W3. The signal amplification section depends on an operational status of the phase counter before and after the rising or the falling edge of the first phase information signal phA and the second phase information signal phB of each phase. When the phase counter counts up (down), the signal amplification section counts up (down) as well.

Figure 9:
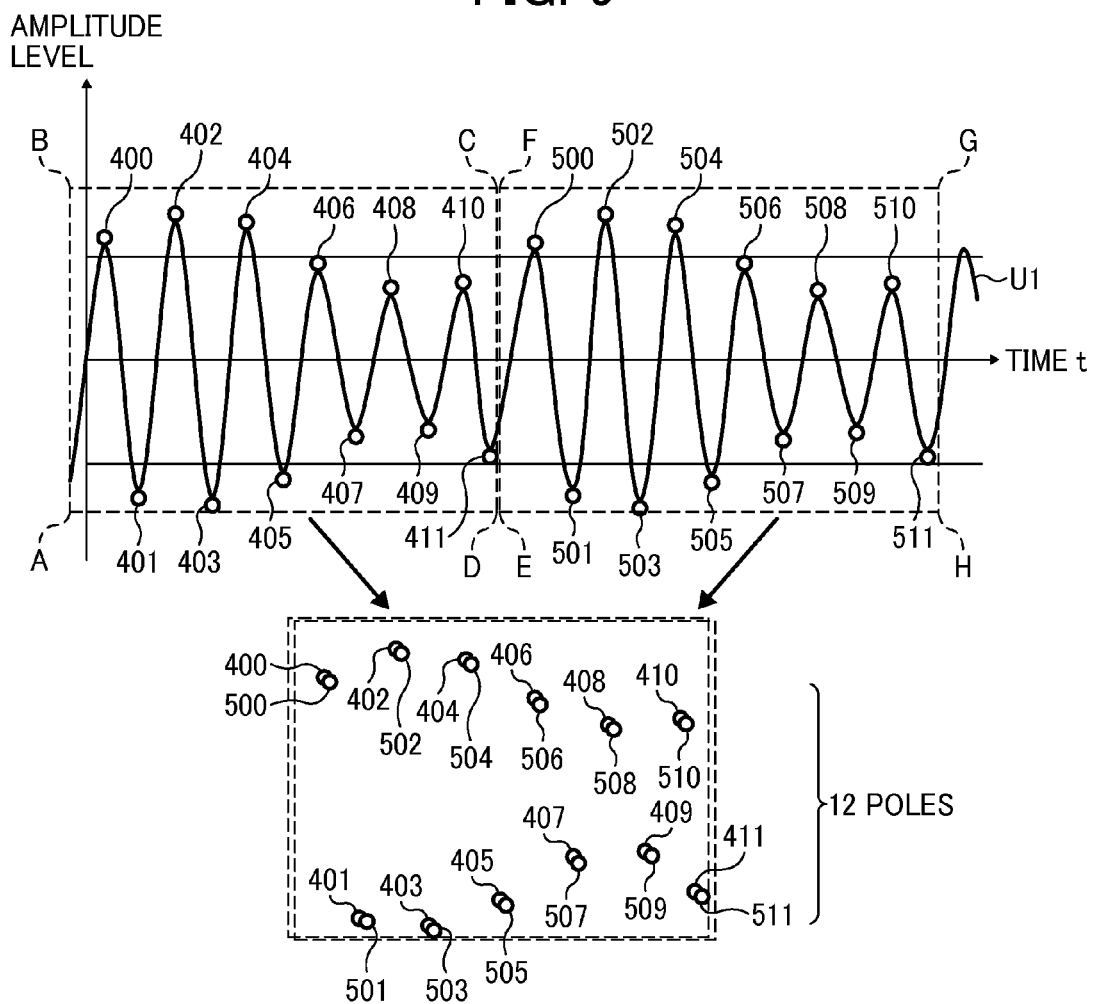
FIG. 9 is a temporal axis waveform diagram showing variation of an amplitude level of a sensor signal U1 relative to a time t.

Further, in the embodiment, pole number information is stored in the memory 70m of the amplification factor controller 70, but the present invention is not limited thereto. The pole number information may be input from the outside of the phase detector 1, or detected according to periodicity of the amplitude level of each of the sensor signals U1, V1 and W1. FIG. 9 is a temporal axis waveform diagram showing variation of an amplitude level of a sensor signal U1 relative to a time t. In FIG. 9, maximum values 400, 402, 404, 406, 408 and 410 of the amplitude level of the sensor signal U1 in an area ABCD coincide with maximum values 500, 502, 504, 506, 508 and 510 of the amplitude level of the sensor signal U1 in an area EFGH respectively. Further, minimum values 401, 403, 405, 407, 409 and 411 of the amplitude level of the sensor signal U1 in an area ABCD coincide with minimum values 501, 503, 505, 507, 509 and 511 of the amplitude level of the sensor signal U1 in an area EFGH respectively. When the sensor signal has a pattern as shown in FIG. 9, the number of the maximum and minimum values is 12, and pole number information of 12 poles is detected. Namely, the pole number information is determined from a total of the number of maximum and minimum values in one cycle of each sensor signal, based on periodicity thereof.

Embodiment 2

Figure 10:
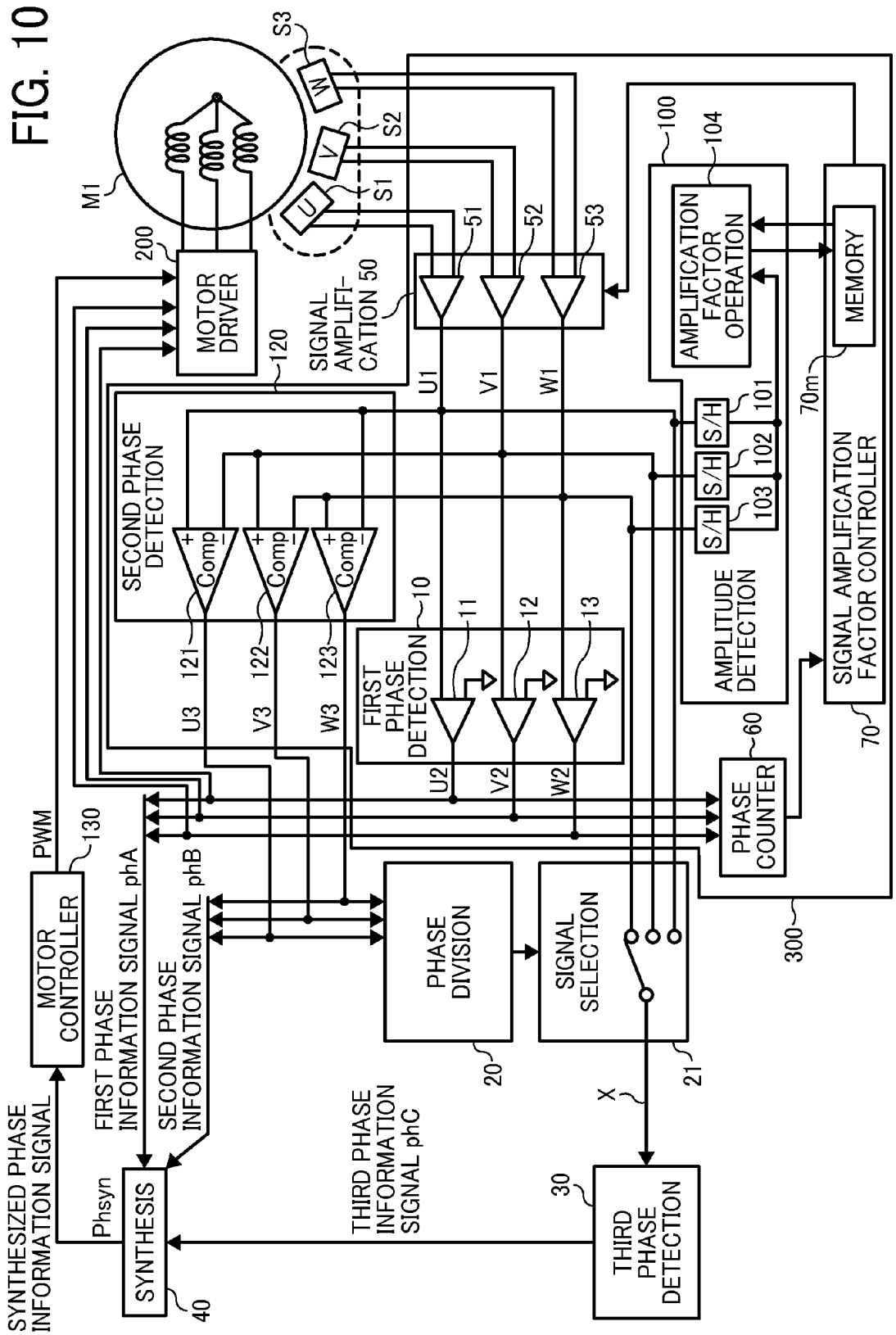
FIG. 10 is a block diagram showing a configuration of an embodiment 2 (a motor drive controller) of the present invention.

FIG. 10 is a block diagram showing a configuration of an embodiment 2 (a motor drive controller) of the present invention. Compared with the phase detector 1 of embodiment 1 in FIG. 1, the motor drive controller of embodiment 2 includes a motor driver 200 and a motor controller 130 as shown in FIG. 10. The motor driver 200 selectively provides drive currents to plural motor coils to rotate a rotor of the motor M1. The motor controller 130 produces a PWM signal to the motor driver 200, based on the second phase information signal phB. The other configurations are the same as those of embodiment 1, and explanations thereof are omitted.

Figure 11:
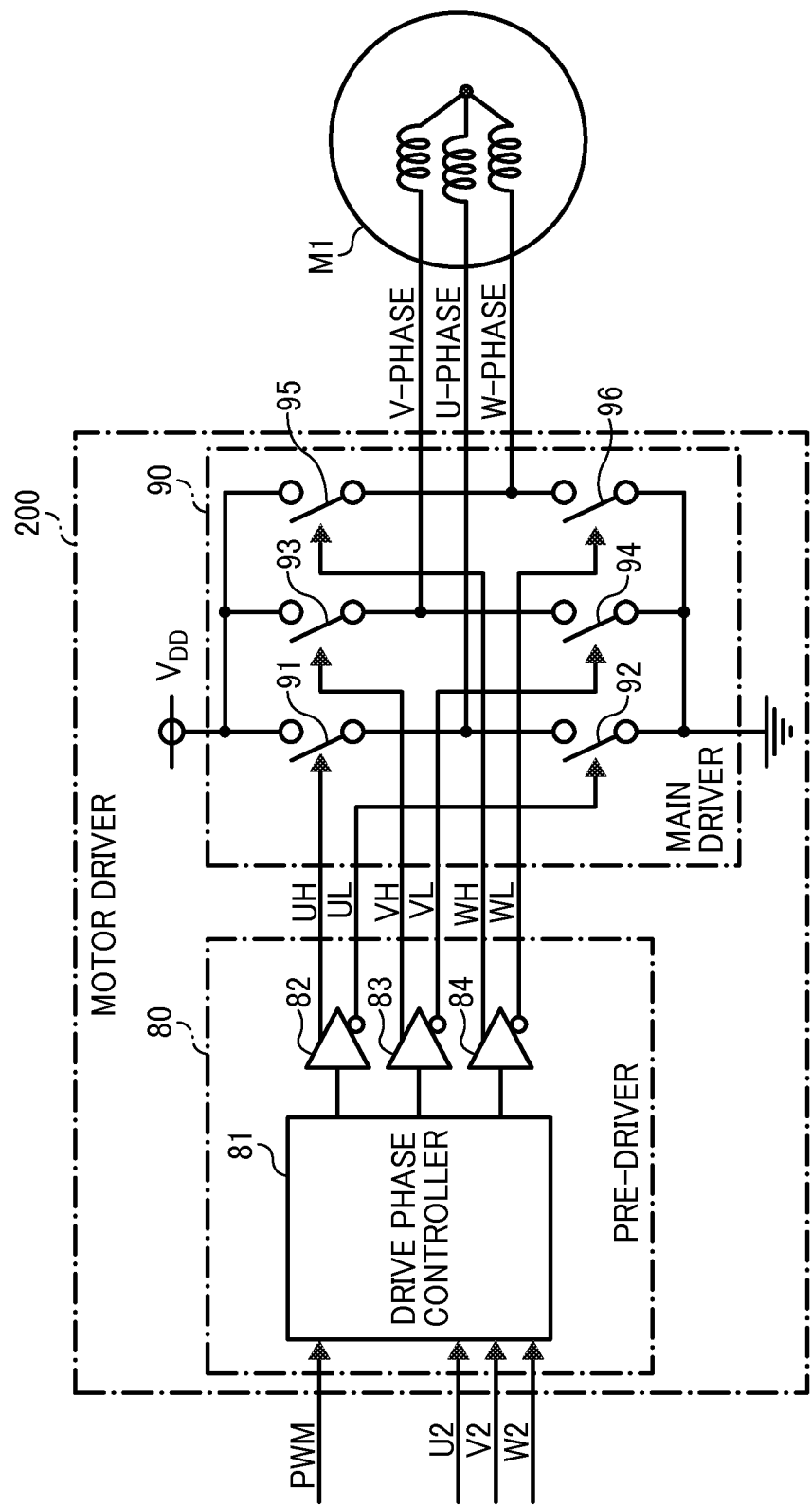
FIG. 11 is a circuit diagram showing a configuration of a motor driver 200 in FIG. 10.

FIG. 11 is a circuit diagram showing a configuration of the motor driver 200 in FIG. 10. In FIG. 11, the motor driver 200 includes a pre-driver 80 and a main driver 90. A three-phase coil including a U-phase, V-phase and a W-phase drives the motor M1 which is a brushless DC motor, and each of the coils are Y-connected in the motor M1. The main driver 90 includes high side switch elements 91, 93 and 95 connected to an electric source side, and low side switch elements 92, 94 and 96 connected to an earthed side. Further, switch control signals UH, UL, VH, VL, WH and WL are produced from the pre-driver 80 to drive switch elements 91 to 96. The pre-driver 80 includes a drive phase controller 81 and three drive amplifiers 82 to 84. The switch control signals UH, UL, VH, VL, WH and WL act as twins. The drive phase controller 81 designates a phase operating synchronous rectification with a PWM duty cycle, a phase turning only the low side on or a phase turning both of the high and low sides off. In addition, the drive phase controller 81 drives the synchronous rectification phase according to a PWM signal of the duty cycle determined by the motor controller 130. To designate the PWM synchronous rectification drive, the low side on or the both sides off, the drive phase controller 81 drives a rotor to rotate with a signal logic of phase information signals U2, V2 and W2 generated on the basis of sensor signals from the magnetic sensors S1 to S3 located near the rotor.

Figure 12:
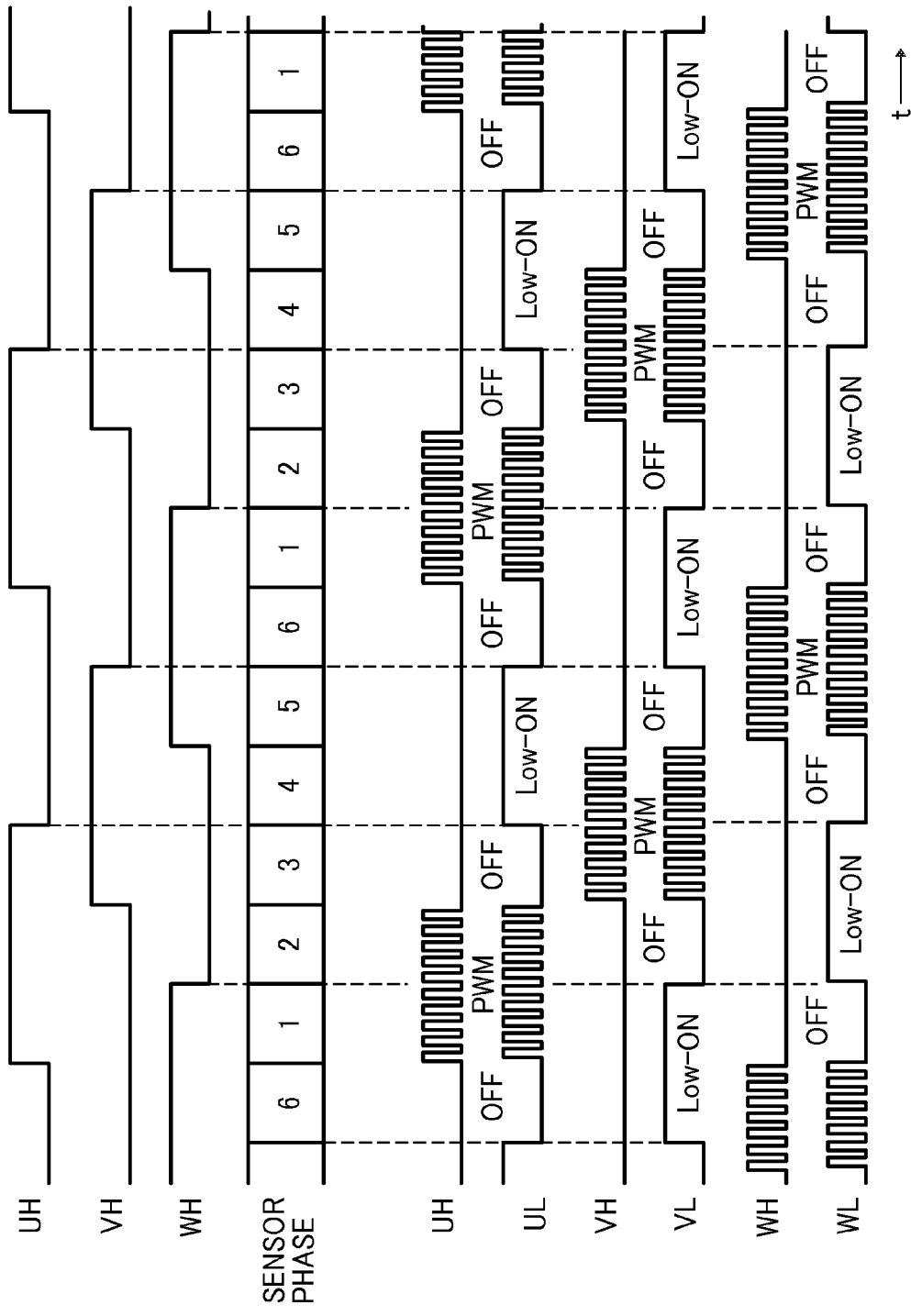
FIG. 12 is a timing chart of each of signals showing operation of the motor driver 200 in FIG. 11.

FIG. 12 is a timing chart of each of signals showing operation of the motor driver 200 in FIG. 11. FIG. 12 shows each switched status example in a signal logic of the sensor signal of each phase, and which is a typical drive method of driving a brushless DC motor.

The motor controller 130 controls a due duty cycle of the PWM signal, based on phase and position information precise as much as possible, and output the PWM signal to the motor driver 200. The motor controller 130 is not necessarily installed. In this case, a drive control voltage instead of the PWM signal is input to the motor driver 200 to compare the drive control voltage with a triangular wave having a specified frame cycle to generate a PWM signal.

The motor drive controller in FIG. 7 characteristically uses phase switching sensors S1, S2 and S3 needed to drive a brushless motor in common with the sensors having plural phase information, explained in embodiments 1 and 2. Further, the first phase detection circuit 10 is commonized as well. Namely, additional sensors are not needed because conventional sensor signals are used.

The motor drive controller of the embodiment has the same effect as that of embodiment 1.

Having now fully described the invention, it will be apparent to one of ordinary skill in the art that many changes and modifications can be made thereto without departing from the spirit and scope of the invention as set forth therein.

What is claimed is:

1. A signal amplifier for a phase detector generating a phase information signal, based on plural sensor signals having amplitude levels in accordance with a rotational position of a rotor of a motor having a plural-phase coil to detect the rotational position thereof, comprising:
   an amplitude detector configured to detect or estimate, for each sensor signal amongst the plural sensor signals, a peak level of the sensor signal, for each signal amplification section amongst plural signal amplification sections into which a phase of the sensor signal is divided by a predetermined number in accordance with a number of poles of the motor, based on a signal level of the sensor signal, to produce a result signal; and
   a signal amplification unit configured to adjust an amplitude level of each of the sensor signals, for said each signal amplification section amongst the signal amplification sections, such that the detected or estimated peak level of the sensor signal for said each signal amplification section amongst the signal amplification sections has a specified amplitude level corresponding to the signal amplification section.

2. The signal amplifier of claim 1, further comprising:
   a signal amplification factor operation circuit configured to operate a signal amplification factor of each of the sensor signals for said each signal amplification section such that the detected or estimated peak level of the sensor signal represented by the result signal from the amplitude detector has a specified amplitude level,
   a signal amplification factor controller configured to store and produce the signal amplification factor,
   wherein the signal amplifier amplifies the amplitude level of the sensor signal, based on the signal amplification factor.

3. The signal amplifier of claim 1, further comprising:
   a phase counter configured to count the number of the phases to determine the signal amplification section, based on the signal levels of the plural sensor signals,
   wherein the signal amplifier distinguishes said each signal amplification section of the sensor signal that divide the phase of the sensor signal by the predetermined number in accordance with the number of poles of the motor, using the number of phases counted by the phase counter.

4. A position detector, comprising:
   the signal amplifier according to claim 1;
   a signal selector configured to select and produce one selection signal from the plural sensor signals for each phase section determined by comparing the plural sensor signals with each other, amplified by the signal amplification unit; and
   a second phase detector configured to compare the selection signal with plural threshold levels to produce a second phase information signal representing a rotational angle smaller than a rotational angle of the rotor.

5. A motor drive controller, comprising the signal amplifier according to claim 1.

6. The signal amplifier of claim 2, wherein the signal amplification factor controller determines the signal amplification section, based on pole number information representing the number of poles of the motor.

7. The signal amplifier of claim 3, further comprising:
   a first phase detector configured to compare the signal level of the sensor signal with a specified threshold level to detect a phase and produce a first phase information signal,
   wherein the phase counter counts the number of the phases, based on the first information signal.

8. The position detector of claim 4, wherein the sensor signal or the relevant signal selected by the signal selector is a continuous signal at a border of the divided phase section having an interval of electric angle of 30° or 60° of the motor.

9. The position detector of claim 4, further comprising a synthesizer configured to synthesize the phase information signal to produce a one-phase digital signal used as a motor drive control signal.

10. A motor drive controller, comprising the position detector according to claim 4.

11. The signal amplifier of claim 6, wherein the pole number information is previously stored in the signal amplification factor controller, input from the outside of the signal amplifier or detected on the basis of periodicity of each of the sensor signals.

12. The signal amplifier of claim 11, wherein the pole number information is determined from a total of a maximum value and a minimum value of each of the sensor signals in one cycle, based on periodicity of each of the sensor signals.

13. A method of detecting a rotational position of a rotor of a motor with a signal amplifier, based on plural sensor signals having amplitude levels in accordance with the rotational position thereof, comprising:
   detecting or estimating, for each sensor signal amongst the plural sensor signals and with an amplitude detector, a peak level of the sensor signal, for each signal amplification section amongst plural signal amplification sections into which a phase of the sensor signal is divided by a predetermined number in accordance with a number of poles of the motor, based on a signal level of the sensor signal to produce a result signal; and adjusting, with a signal amplification unit, an amplitude level of each of the sensor signals, for said each signal amplification section amongst the signal amplification sections, such that the detected or estimated peak level of the sensor signal for said each signal amplification section amongst the signal amplification sections has a specified amplitude level corresponding to the signal amplification section.

* * * * *